United States Patent
Yang et al.

(10) Patent No.: US 8,601,943 B2
(45) Date of Patent: Dec. 10, 2013

(54) PRESS FIXTURE

(75) Inventors: Guang Yang, Shenzhen (CN); Hong-Wei Ren, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 13/109,978

(22) Filed: May 17, 2011

(65) Prior Publication Data

US 2012/0186468 A1    Jul. 26, 2012

(30) Foreign Application Priority Data

Jan. 21, 2011    (CN) .......................... 2011 1 0024422

(51) Int. Cl.
   *B23P 19/027*    (2006.01)
(52) U.S. Cl.
   CPC .................................. *B23P 19/027* (2013.01)

USPC ......... 100/102; 100/214; 100/269.01; 29/730

(58) Field of Classification Search
USPC ............. 100/102, 214, 269.01, 269.05; 29/2, 29/623.1, 729, 730

See application file for complete search history.

(56) References Cited

U.S. PATENT DOCUMENTS

| | | | | |
|---|---|---|---|---|
| 3,109,927 A | * | 11/1963 | Lesnett, Jr. ....................... 377/24 |
| 3,908,739 A | * | 9/1975 | Cushman ........................ 164/80 |
| 3,918,994 A | * | 11/1975 | Davis ............................. 429/145 |
| 5,425,170 A | * | 6/1995 | Spiegelberg et al. ........... 29/874 |
| 7,464,641 B2 | * | 12/2008 | Kang et al. ..................... 100/219 |
| 2010/0306995 A1 | * | 12/2010 | Scheuerman et al. ........ 29/623.1 |

\* cited by examiner

*Primary Examiner* — Jimmy T Nguyen

(74) *Attorney, Agent, or Firm* — Altis Law Group, Inc.

(57) ABSTRACT

A press fixture for pressing a housing and a battery together includes an air cylinder, a motor to control a motion of the air cylinder, a controller, a base, and a support mounted on the base. The support is used to receive the battery. The housing is placed on the battery. The controller controls the motor to drive the air cylinder to press the housing and the battery together in response user input.

6 Claims, 5 Drawing Sheets

PRESS FIXTURE

BACKGROUND

1. Technical Field

The present disclosure relates to press fixtures and, particularly, to a press fixture for pressing a housing and a battery together.

2. Description of Related Art

During assembling electronic devices, batteries may be pressed into place at a predetermined position in a housing. However, because the size of the battery is small, it is not easy to precisely position in the battery. Also, a press fixture may be used on the battery, and even a small variance in the pressure used may damage the battery.

Therefore, what is needed is a press fixture to overcome the described limitations.

DETAILED DESCRIPTION

Figure 1:
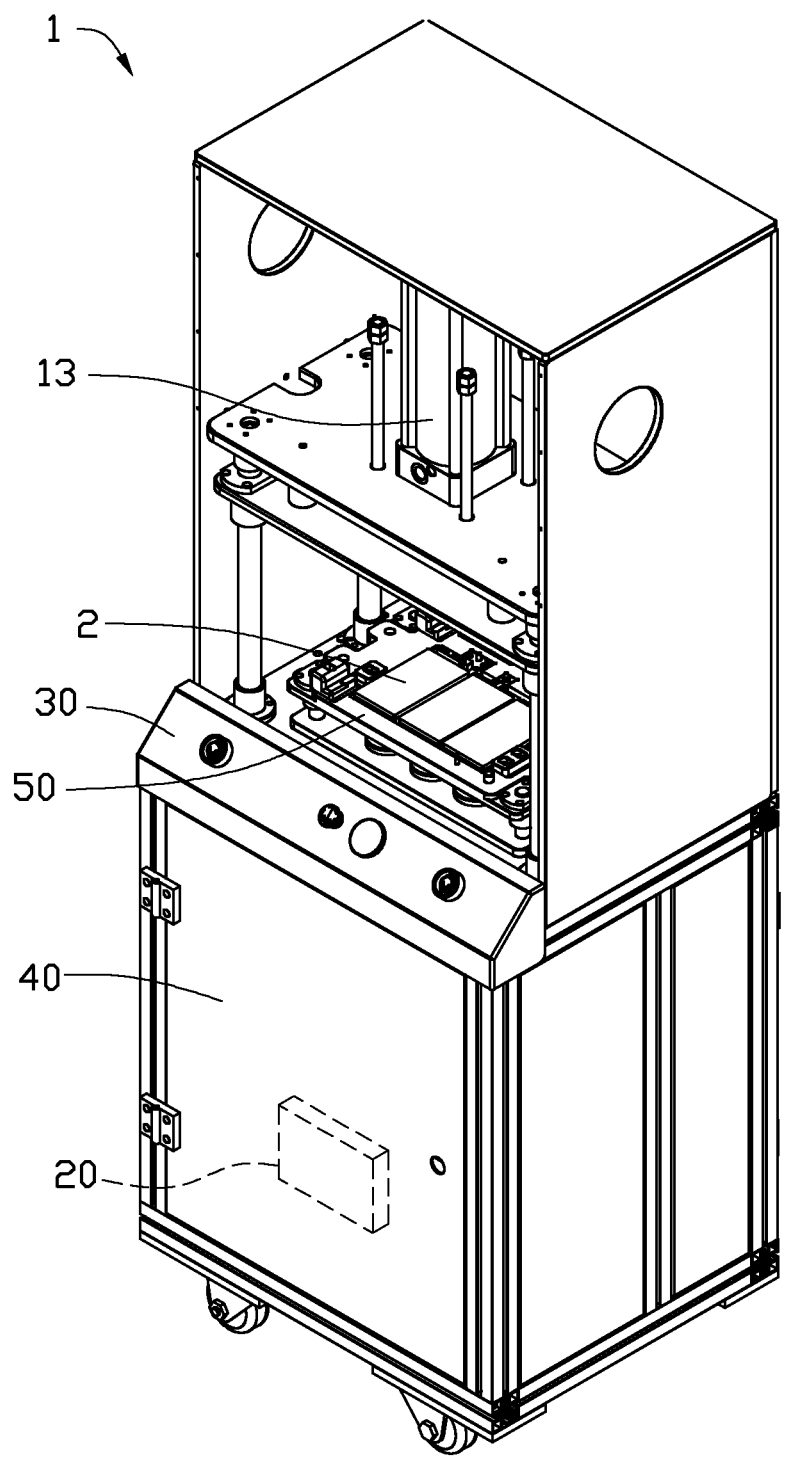
FIG. 1 is an isometric view of a press fixture in accordance with an exemplary embodiment.
Figure 2:
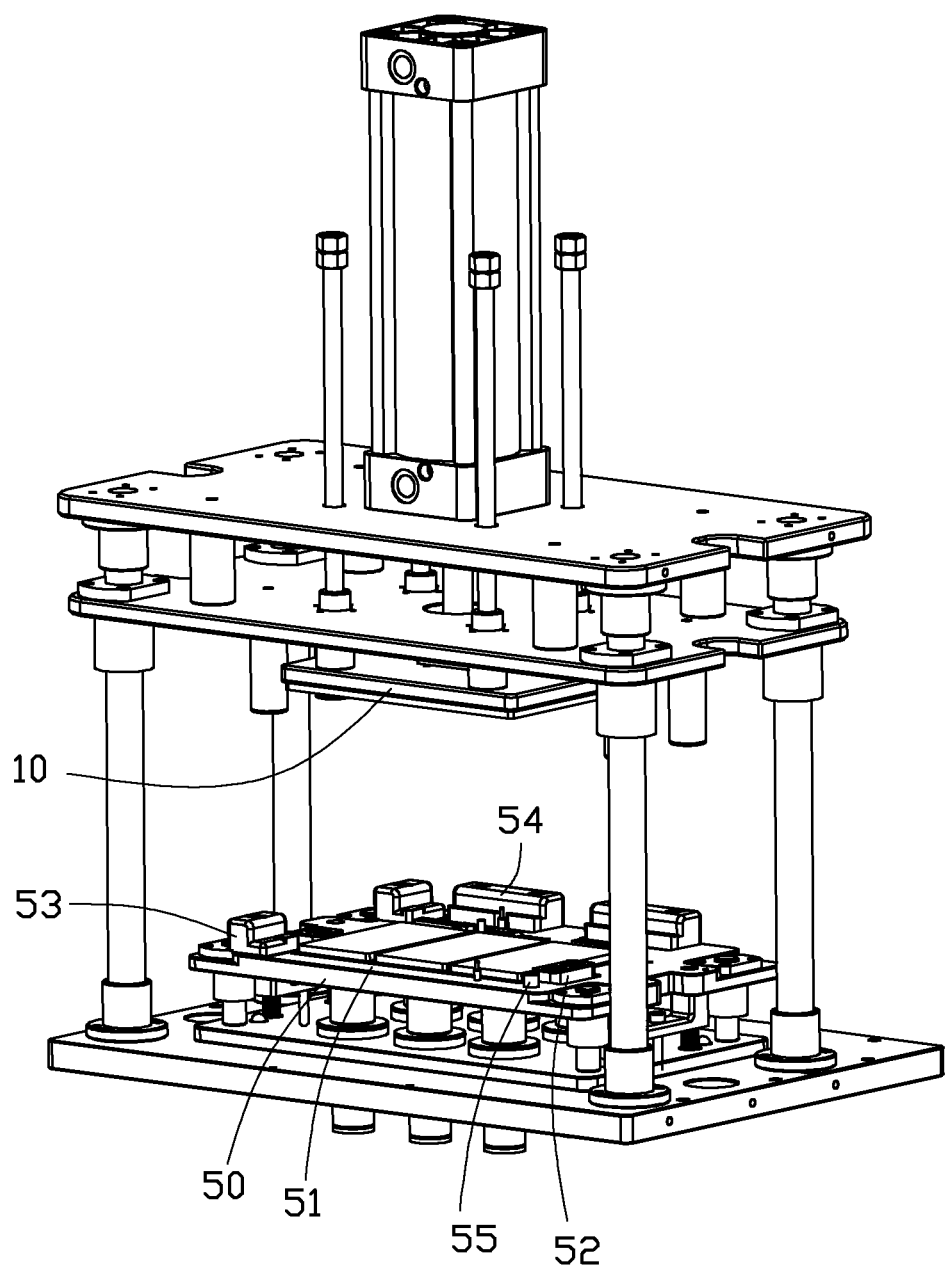
FIG. 2 is a partial, isometric view of the press fixture of FIG. 1.
Figure 3:
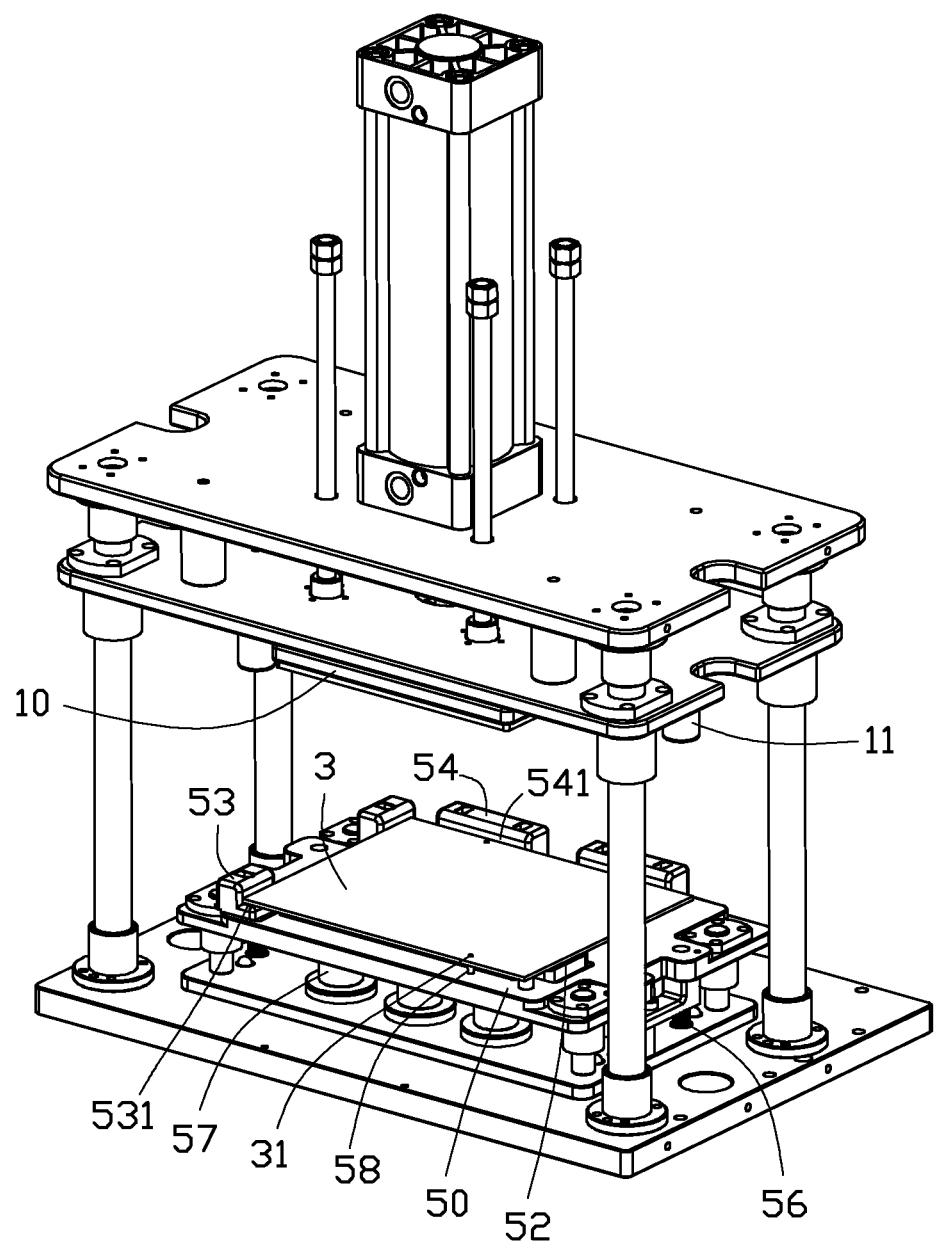
FIG. 3 shows a housing being placed on the press fixture of FIG. 1.

Referring to FIGS. 1-3, an embodiment of a press fixture 1 for pressing a housing 3 and a battery 2 together is illustrated. The press fixture 1 includes an air cylinder 13, a board 10 mounted on a lower surface of the air cylinder 13, a motor 20, a controller 30, a base 40, and a support 50 mounted on the base 40. The motor 20 is placed within the base 40. The controller 30 is configured for controlling the motor 20 to raise and lower the air cylinder 13 in response to user input, thereby causing the board 10 to raise and lower relative to the support 50. In one embodiment, the structure between the motor 20 and the air cylinder 13 is prior art, so the detailed description about that how to raise and lower the air cylinder 13 by the motor 20 is omitted. A recessed portion 51 is defined on a top surface of the support 50. A number of first positioning blocks 52, second positioning blocks 53, third positioning blocks 54, and two protrusions 55 are mounted on the top surface of the support 50. The recessed portion 51 is configured for receiving the battery 2. The housing 3 is placed on the battery 2. The first positioning blocks 52, second positioning blocks 53, third positioning blocks 54 cooperate with the two protrusions 55 to fix the housing 3 on the battery 2. The controller 30 is configured for controlling the motor 20 to drive the air cylinder 13 and the board 10 to press the housing 3 and the battery 2 together in response to user input. In order to better understand the disclosure, an exemplary embodiment is described in detail.

At least two pairs of posts 11 having a substantially equal height are mounted on a lower surface of the board 10. The posts 11 are driven by the board 10 and the air cylinder 13 to press two opposite sides of the support 50. In one embodiment, there are two pairs of the posts 11.

An anti-static pad 12 is mounted on the lower surface of the board 10. The anti-static pad 12 is used to prevent static electricity from generating when the board 10 contacts the housing 3.

Figure 4:
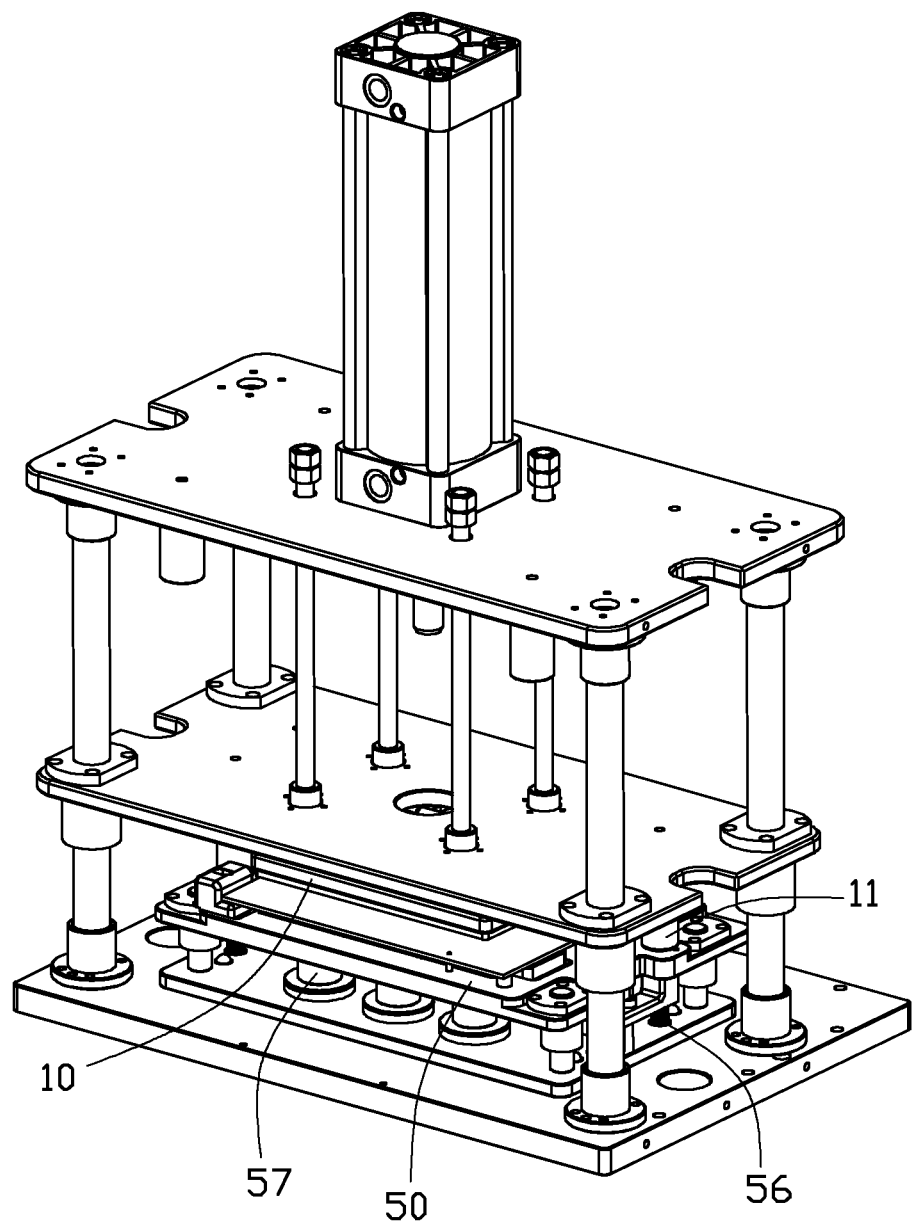
FIG. 4 shows a number of posts of the press fixture of FIG. 1 pressing a support of the press fixture of FIG. 1.

Referring to FIG. 4, the press fixture 1 further includes a number of first elastic elements 56 and a number of second elastic elements 57 mounted on a lower surface of the support 50. The first elastic elements 56 and the second elastic elements 57 are configured for buffering any excessive pressing force from the posts 11 when the posts 11 press the support 50. After the pressing force from the posts 11 applied on the support 50 is released, the first elastic elements 56 and the second elastic elements 57 rebound to drive the support 50 to return to an original position. In one embodiment, the first elastic elements 56 and the second elastic elements 57 are springs. There are six of the first elastic elements 56, and four of the second elastic elements 57.

The second positioning blocks 53 are step-shaped, and each includes a step 531. At least two pins 58 are set on the sides of the recessed portion 51. The third positioning blocks 54 are step-shaped, and each includes a step 541. At least two holes 31 for receiving the two pins 58 are defined on the lower surface of the housing 3. In one embodiment, the number of holes 31 is equal to that of the pins 58. The housing 3 is placed on the steps 531, the steps 541, the first positioning block 52, and the two protrusions 55, and the pins 57 are received in the holes 31 of the housing 3, thereby fixing the housing 3 on the battery 2.

Figure 5:
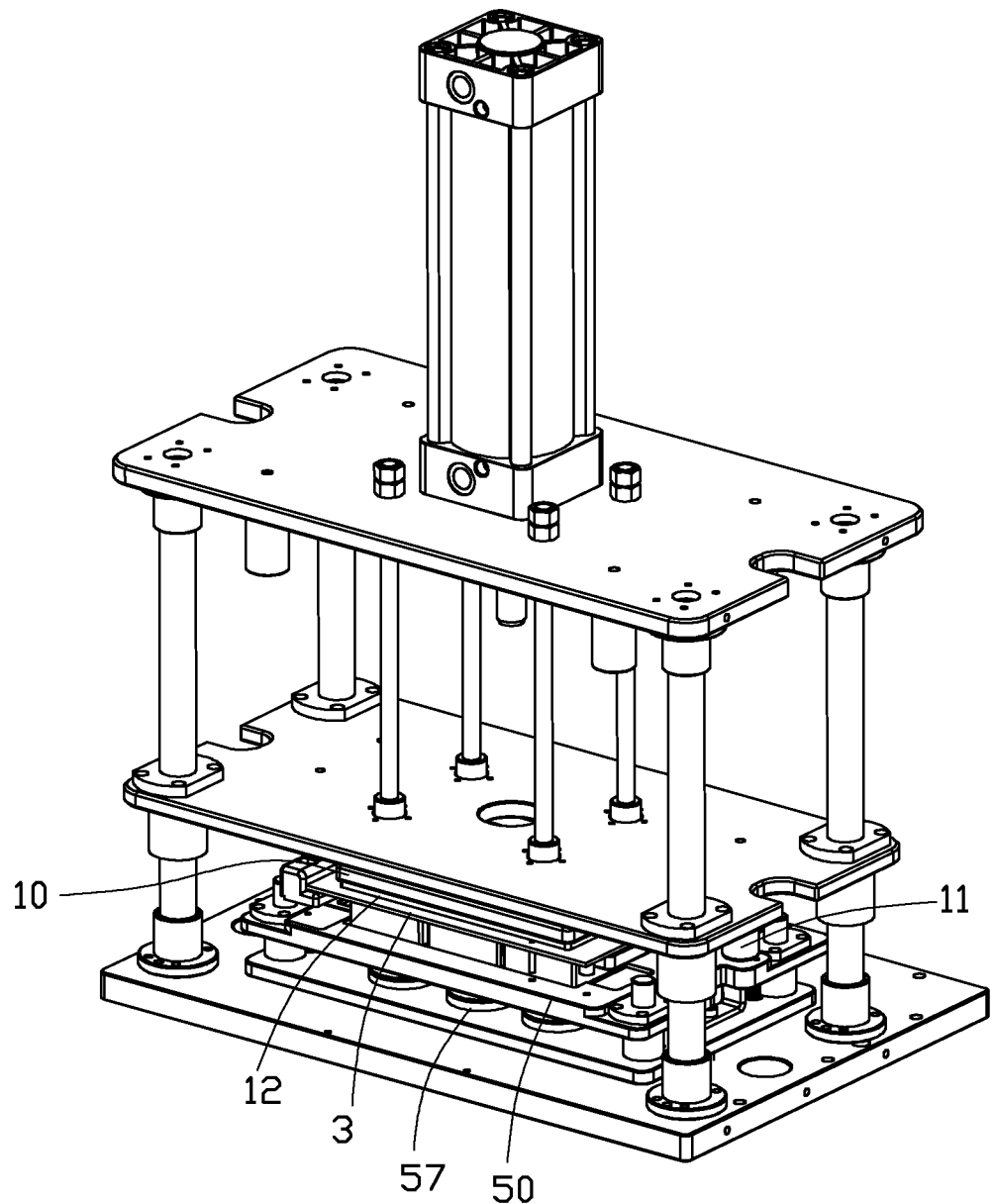
FIG. 5 shows an air cylinder of the press fixture of FIG. 1 pressing the housing of the press fixture of FIG. 1.

Referring to FIG. 5, to press the housing 3 and the battery 2 together, the battery 2 is placed on the recessed portion 51 of the support 50, and the housing 3 is placed on the battery 2. The controller 30 controls the motor 20 to drive the air cylinder 13 and the board 10 to the support 50 in response to user input until the posts 11 press the support 50 to move to the housing 3. After the posts 11 press the support 50, the controller 30 continuously controls the motor 20 to drive the air cylinder 13 and the board 10 to press the support 50 until the housing 3 and the battery 2 are pressed together, thereby avoiding the air cylinder 13 and the board 10 directly pressing and possibly damaging the battery 2. During the process of pressing the support 50, the first elastic elements 56 and the second elastic elements 57 are deformed, thereby preventing the support 50 from being damaged.

After the housing 3 and the battery 2 are pressed together, the air cylinder 13 is driven by the motor 20 to move away from the support 50. The first elastic elements 56 and the second elastic elements 57 rebound to drive the support 50 to return to the original position, thereby providing convenience for user to take a combination of the housing 3 and the battery 2.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A press fixture for pressing a housing and a battery together, wherein at least two holes are defined on a lower surface of the housing, the press fixture comprising:

an air cylinder;
a board mounted on a lower surface of the air cylinder;
a motor;
a controller to control the motor to raise and lower the air cylinder in response to user input;
a base; and
a support mounted on the base, wherein a recessed portion for receiving the battery is defined on a top surface of the support, at least two pins are set on the sides of the recessed portion, a plurality of first positioning blocks, a plurality of second positioning blocks, a plurality of third positioning blocks and two protrusions are set on the top surface of the support, each second positioning block comprises a step, each third positioning block comprises a step, the housing is placed on the steps of the first positioning blocks, the steps of the second positioning blocks, first positioning blocks and the two protrusions, and the at least two pins are received into the at least two holes, thereby fixing the housing on the battery;

wherein when pressing the housing and the battery together, the housing is placed on the battery, and the controller controls the motor to drive the air cylinder and the board to press the housing and the battery together in response user input.

2. The press fixture as described in claim 1, further comprising:
  a plurality of first elastic elements and a plurality of second elastic elements mounted on a lower surface of the support; and
  at least two pairs of posts having a substantially equal height mounted on a lower surface of the board;

wherein the at least two pairs of posts is driven by the air cylinder and the board to press the support, the first elastic elements and the second elastic elements are configured for buffering any excessive pressing force from the posts applied on the support.

3. The press fixture as described in claim 2, wherein the first elastic elements and the second elastic elements are springs.

4. The press fixture as described in claim 2, wherein after the housing and the battery are pressed together, the first elastic elements and the second elastic elements rebound to drive the support to return to an original position.

5. The press fixture as described in claim 1, wherein the second positioning blocks and the third positioning blocks are step-shaped.

6. The press fixture as described in claim 1, further comprising:
  an anti-static pad mounted on the lower surface of the board, wherein the anti-static pad is configured for preventing static electricity from generating when the air cylinder contacts the housing.

* * * * *